Patented Apr. 3, 1945

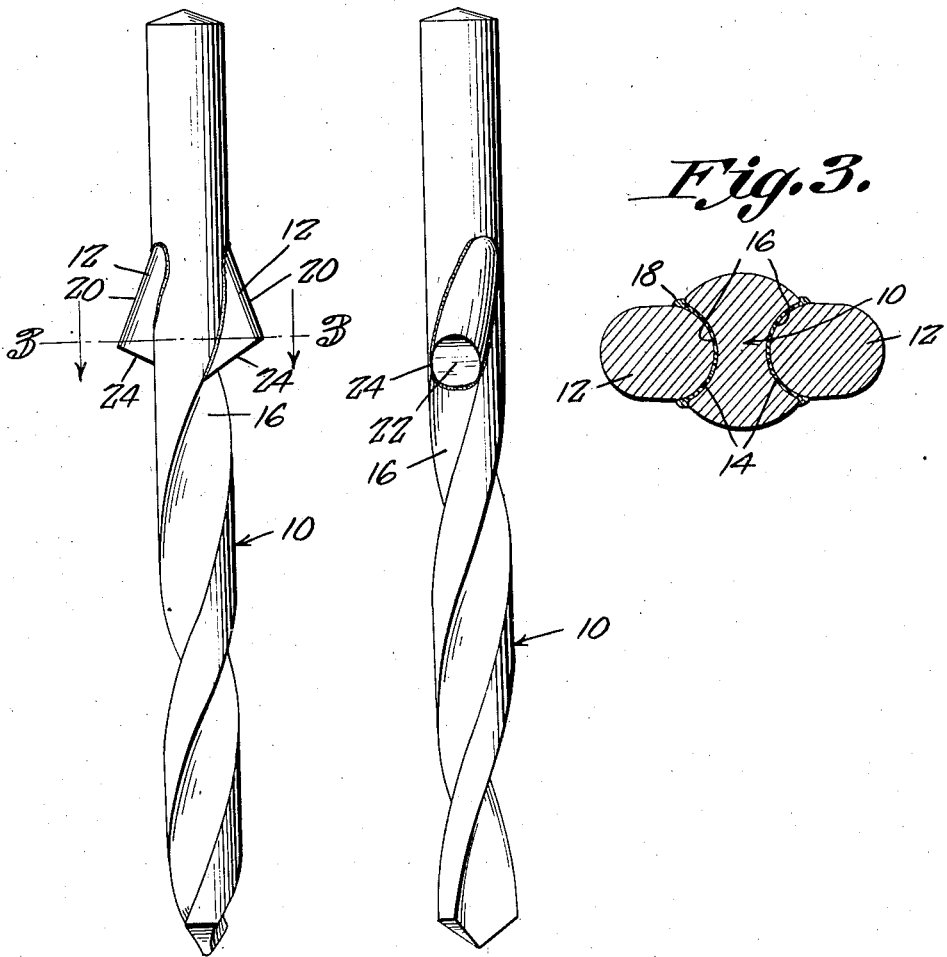

2,372,719

UNITED STATES PATENT OFFICE 2,372,719

COUNTERSINKING DRILL

Douglas H. Freese, Portage Des Sioux, Mo.

Application June 1, 1943, Serial No. 489,286

1 Claim. (Cl. 77—66)

My invention relates to the forming of countersunk bolt and rivet holes in metallic parts, and has among its objects and advantages the provision of an improved countersinking drill whereby aligned holes may be simultaneously bored in the work in a single continuous operation.

In the accompanying drawing:

Figure 1 is a view of a conventional drill showing my invention incorporated therein;

Figure 2 is a view of the same drill rotated ninety degrees; and

Figure 3 is a sectional view taken along the line 3—3 of Figure 1.

In the embodiment of the invention selected for illustration, I make use of a conventional drill 10 to which I attach two countersinking formations 12. The formations 12 are identical and each comprises a metallic body having a curved face 14 shaped to fit in the groove 16 of the drill. Welded connections 18 attach the bodies firmly to the drill.

The formations 12 project laterally of the drill in diametrically opposite directions distances such as to provide a countersunk hole of the desired diameter, the distances varying with respect to drill diameters. Each formation has an outer rounded face 20 tapering to the diameter of the drill and in the direction of the shank thereof.

The end faces 22 of the formations 12 converge toward the cutting end of the drill and terminate in cutting edges 24 angled to cut the countersunk hole with the correct taper.

A countersinking drill in accordance with my invention requires a relatively small amount of material. The two steel formations are securely attached to the drill and are so located as not to impair the drill for ordinary drilling purposes.

Without further elaboration, the foregoing will so fully illustrate my invention, that others may, by applying current knowledge, readily adapt the same for use under various conditions of service.

I claim:

A countersink drill comprising a bit formed with spiral grooves having their inner extremities gradually merging into the surface of the shank portion thereof, and an elongated countersink cutter body fixedly seated in the outwardly sloping portion of the inner extremity of each of the grooves, the outer cutting end of the body being substantially circular in cross-section and disposed at an angle to the axis of the bit corresponding to the angle of clearance at the outer end of the latter, the outer side of the body being substantially cylindrical and sloping upwardly and inwardly to merge into the surface of the shank coincidently with the groove.

DOUGLAS H. FREESE.